(12) United States Patent
Kim et al.

(10) Patent No.: US 10,483,554 B2
(45) Date of Patent: Nov. 19, 2019

(54) CARBON SUPPORT FOR FUEL CELL CATALYST AND PREPARATION METHOD THEREOF

(71) Applicant: KOREA INSTITUTE OF SCIENCE AND TECHNOLOGY, Seoul (KR)

(72) Inventors: Jin Young Kim, Seoul (KR); Sung Jong Yoo, Seoul (KR); Dirk Henkensmeier, Seoul (KR); Jong Hyun Jang, Seoul (KR); Hyoung-Juhn Kim, Seoul (KR); Yeon Hun Jeong, Seoul (KR); Nayoung Kim, Seoul (KR); Chang Won Yoon, Seoul (KR); Jonghee Han, Seoul (KR); Suk Woo Nam, Seoul (KR); Tae Hoon Lim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 900 days.

(21) Appl. No.: 14/979,877

(22) Filed: Dec. 28, 2015

(65) Prior Publication Data

US 2017/0005342 A1    Jan. 5, 2017

(30) Foreign Application Priority Data

Jul. 1, 2015 (KR) .......................... 10-2015-0094339

(51) Int. Cl.
| | |
|---|---|
| H01M 4/88 | (2006.01) |
| H01M 4/90 | (2006.01) |
| H01M 4/92 | (2006.01) |
| B01J 27/24 | (2006.01) |

(52) U.S. Cl.
CPC .............. *H01M 4/926* (2013.01); *B01J 27/24* (2013.01); *H01M 4/8817* (2013.01); *H01M 4/9083* (2013.01); *C01B 2203/1082* (2013.01)

(58) Field of Classification Search
None
See application file for complete search history.

(56) References Cited

U.S. PATENT DOCUMENTS

| | | | | |
|---|---|---|---|---|
| 2010/0276644 A1* | 11/2010 | Wolf | ...................... | B01J 23/002 252/512 |
| 2011/0281204 A1* | 11/2011 | Wu | ........................ | B82Y 30/00 429/527 |
| 2012/0270138 A1* | 10/2012 | Koshino | ................ | C08G 61/10 429/482 |
| 2013/0288155 A1* | 10/2013 | Kim | ...................... | H01M 4/926 429/483 |

FOREIGN PATENT DOCUMENTS

| | | |
|---|---|---|
| JP | 2013-232409 A | 11/2013 |
| KR | 10-2011-0070353 A | 6/2011 |
| KR | 10-2012-0061484 B1 | 6/2012 |

* cited by examiner

*Primary Examiner* — Atul P. Khare
(74) *Attorney, Agent, or Firm* — Goldilocks Zone IP Law

(57) ABSTRACT

Disclosed is a carbon support for a fuel cell catalyst that supports a metal. The carbon support includes a conductive carbon support and nitrogen atoms doped into the conductive carbon support. Also disclosed is a method for preparing the carbon support. Also disclosed is a catalyst including the carbon support. The catalyst has greatly improved degradation resistance compared to conventional catalysts for fuel cells. In addition, the catalyst is not substantially degraded even when applied to a single cell.

12 Claims, 8 Drawing Sheets

CARBON SUPPORT FOR FUEL CELL CATALYST AND PREPARATION METHOD THEREOF

CROSS-REFERENCE TO RELATED APPLICATIONS

This application claims priority under 35 U.S.C. § 119 to Korean Patent Application No. 10-2015-0094339 filed on Jul. 1, 2015 in the Korean Intellectual Property Office, the disclosure of which is incorporated herein by reference in its entirety.

BACKGROUND OF THE INVENTION

1. Field of the Invention

The present invention relates to a carbon support for a fuel cell catalyst that has improved electrochemical resistance compared to conventional carbon supports for fuel cell catalysts, and a method for preparing the same.

2. Description of the Related Art

Carbon materials are easy to synthesize on a large scale and have high electrical conductivity, large specific surface area, and good acid/base stability. Due to these advantages, carbon materials are increasingly applied to related electrochemical devices. Various carbon materials are also employed as catalyst supports for anode/cathode electrochemical reactions in fuel cell devices, which have recently received a great deal of attention as renewable energy sources. However, carbon black supports are almost exclusively being used.

As the commercialization of fuel cells is becoming a reality, there is a growing interest in fuel cells with improved initial performance and long-term performance.

Platinum (Pt) exhibits the most efficient catalytic activity for electrochemical reactions for driving fuel cells among catalyst materials developed hitherto but its high price is an obstacle to the commercialization of fuel cells. As much progress has recently been made in the development of Pt recovery methods, many problems encountered in the use of Pt catalysts have been solved.

However, fuel cells suffer from performance problems arising from electrochemical reactions upon long-term operation. Particularly, fuel cells for automobiles have stability problems associated with electrochemical oxidation/corrosion of carbon supports, causing thinning of catalyst layers and agglomeration of catalysts, which are considered major causes of poor long-term performance of fuel cells.

In attempts to solve such problems, there is a need to develop supports that are highly stable and have good resistance to corrosion under an electrochemical atmosphere so that catalytic reactions can be efficiently and stably maintained under various fuel cell operating conditions.

In recent years, considerable research efforts have concentrated on the synthesis of carbon materials highly resistant to corrosion or oxidation. For example, graphitized carbon materials (e.g., CNTs and graphene) are relatively slowly degraded by electrochemical corrosion compared to carbon black but are not perfectly resistant to degradation. To our knowledge, perfectly degradation-resistant materials have been never reported to date.

Alternatively, much research has been conducted to develop catalyst supports using non-carbon materials instead of carbon materials. Oxide/nitride/carbide carriers have recently been proposed as promising candidate materials but their high catalytic activity is difficult to induce due to various reasons, such as their low electrical conductivity and poor physicochemical properties with catalysts.

Carbon materials have been exclusively used to date as supports for fuel cell catalysts but the internal elements of devices using such carbon materials may be exposed to external factors, such as voltage variations, water, and various gas atmospheres, under various operating conditions (including dynamic load cycling, fuel starvation, freeze/thaw, and start-up/shut-down conditions). Particularly, Pt/C as an electrode catalyst undergoes electrochemical corrosion or oxidation when exposed to water or oxygen under high voltage conditions. This is known as a main factor causing a serious deterioration in the performance of fuel cells.

Thus, there is an urgent need to develop technologies for electrochemically stable supports.

PRIOR ART DOCUMENTS

Patent Documents

Korean Patent Publication No. 2011-0070353
Korean Patent No. 1272514

SUMMARY OF THE INVENTION

It is one object of the present invention to provide a carbon support for a fuel cell catalyst that has improved electrochemical resistance compared to conventional carbon supports for fuel cell catalysts.

It is a further object of the present invention to provide a method for preparing the carbon support.

It is another object of the present invention to provide a catalyst for a fuel cell using the carbon support.

One aspect of the present invention provides a carbon support for a fuel cell catalyst including a conductive carbon support and nitrogen atoms doped into the conductive carbon support.

The nitrogen atoms may be doped into the conductive carbon support by heating the conductive carbon support and the nitrogen atoms to 500 to 750° C. under a nitrogen atmosphere.

The conductive carbon support may be selected from the group consisting of carbon black, acetylene black, carbon nanotubes (CNTs), graphite, graphene, graphite nanofibers (GNFs), fullerenes, and combinations thereof.

A further aspect of the present invention provides a method for preparing a carbon support for a fuel cell catalyst, including (A) mixing a conductive carbon support with a nitrogen-containing organic material, (B) primarily annealing the mixture, and (C) secondarily annealing the primarily annealed mixture at a temperature higher than the primary annealing temperature under a nitrogen atmosphere.

In step (A), the conductive carbon support may be mixed with the nitrogen-containing organic material in a weight ratio of 1:0.5-3.

In step (A), the conductive carbon support and the nitrogen-containing organic material may be dissolved in at least one solvent selected from the group consisting of distilled water and organic solvents, such as methanol, ethanol, and ethylene glycol.

In step (A), the conductive carbon support may be selected from the group consisting of carbon black, acetylene black, carbon nanotubes (CNTs), graphite, graphene, graphite nanofibers (GNFs), fullerenes, and combinations thereof.

In step (A), the nitrogen-containing organic material may be selected from the group consisting of dicyandiamide, pyrrole, aniline, phthalocyanine, porphyrin, acetonitrile, cyanamide, acrylonitrile, polypyrrole, polyaniline, polyacrylonitrile, melamine, and mixtures thereof.

In step (B), the primary annealing may be performed in ambient air and the primary annealing temperature may be from 90 to 150° C.

In step (C), the secondary annealing temperature may be from 500 to 750° C.

Another aspect of the present invention provides a catalyst for a fuel cell including the carbon support doped with nitrogen atoms and a metal supported on the carbon support.

The metal may be selected from the group consisting of platinum, gold, silver, iridium, palladium, rhodium, and combinations thereof.

The catalyst of the present invention is produced using the carbon support in which nitrogen atoms are doped. The catalyst of the present invention exhibits high catalytic performance (such as degradation resistance) under various operating conditions and its degradation resistance is effectively maintained. In addition, the catalyst of the present invention is not substantially degraded even when applied to a single cell or stack, achieving good electrochemical resistance.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
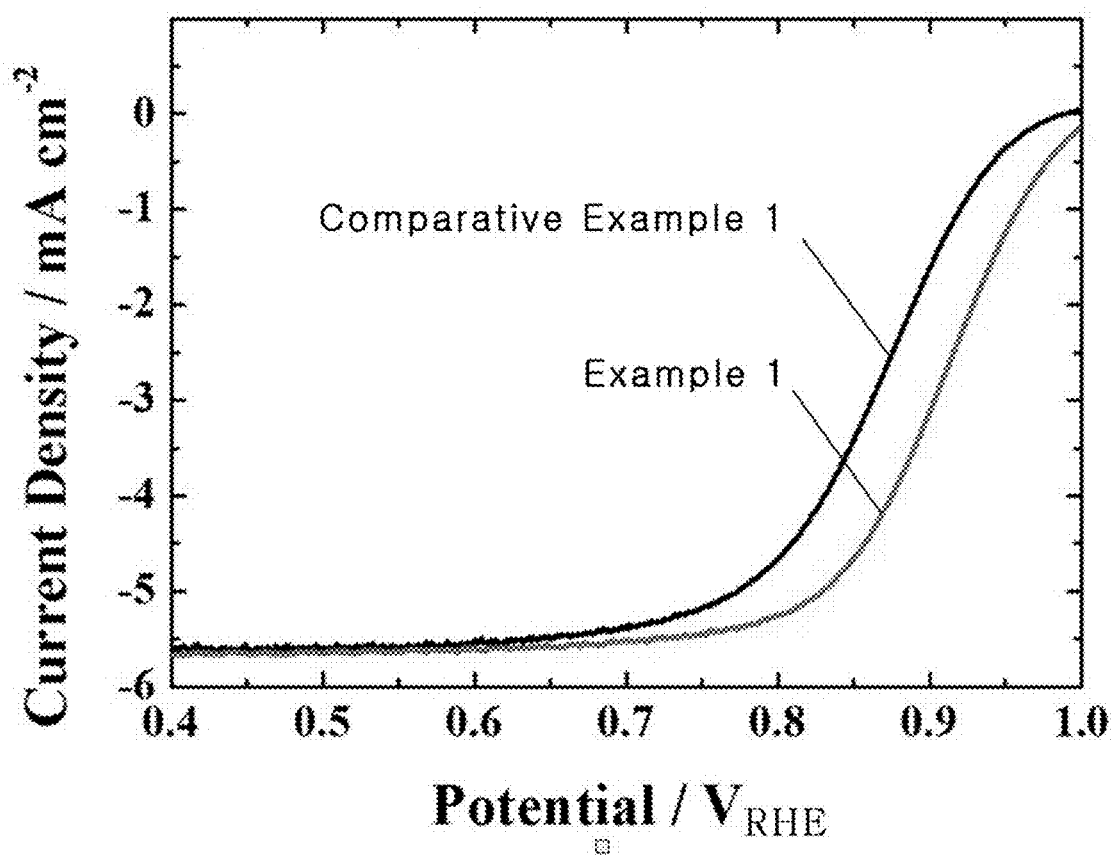
FIG. 1 shows oxygen reduction reaction (ORR) polarization curves for a $Pt/C_{doped\ with\ nitrogen\ atoms}$ catalyst prepared in Example 1 and a Pt/C catalyst prepared in Comparative Example 1 to compare the initial performance of half cells using the catalysts.

The present invention is directed to a carbon support for a fuel cell catalyst that has improved electrochemical degradation resistance compared to conventional carbon supports for fuel cell catalysts, and a method for preparing the same.

The carbon support serves to support a metal. The metal-supported carbon support is used as a catalyst for a fuel cell.

The present invention will now be described in detail.

The present invention provides a carbon support for a fuel cell catalyst including a conductive carbon support and nitrogen atoms doped into the conductive carbon support. The carbon support of the present invention is prepared through primary annealing in ambient air and secondary annealing under a nitrogen atmosphere. Particularly, the annealing under a nitrogen atmosphere is required to completely dope the nitrogen atoms into the conductive carbon support.

The amount of the nitrogen atoms doped into the conductive carbon support is from 5 to 50 parts by volume, based on 100 parts by volume of the conductive carbon support.

The present invention also provides a method for preparing a carbon support for a fuel cell catalyst.

The method of the present invention includes (A) mixing a conductive carbon support with a nitrogen-containing organic material, (B) primarily annealing the mixture, and (C) secondarily annealing the primarily annealed mixture at a temperature higher than the primary annealing temperature under a nitrogen atmosphere.

In step (A), the conductive carbon support is mixed with the nitrogen-containing organic material by dissolving them in a solvent.

The conductive carbon support is mixed with the nitrogen-containing organic material in a weight ratio of 1:0.5-3, preferably 1:1-2. If the content of the nitrogen-containing organic material with respect to that of the conductive carbon support is less than the lower limit defined above, nitrogen is doped in a small amount, making it impossible to expect the desired effects. Meanwhile, if the content of the nitrogen-containing organic material exceeds the upper limit defined above, a large amount of nitrogen atoms may be doped into the conductive carbon support, and as a result, the electrical conductivity of the carbon support is reduced, resulting in performance deterioration.

The solvent serves to dissolve the conductive carbon support and the nitrogen-containing organic material and acts as an auxiliary that assists in easily doping nitrogen atoms into the conductive carbon support. Specifically, the solvent may be selected from the group consisting of distilled water and organic solvents, such as methanol, ethanol, and ethylene glycol. Distilled water is preferred.

The conductive carbon support may be selected from the group consisting of carbon black, acetylene black, carbon nanotubes (CNTs), graphite, graphene, graphite nanofibers (GNFs), fullerenes, and combinations thereof.

The nitrogen-containing organic material may be selected from the group consisting of dicyandiamide, pyrrole, aniline, phthalocyanine, porphyrin, acetonitrile, cyanamide, acrylonitrile, polypyrrole, polyaniline, polyacrylonitrile, melamine, and mixtures thereof.

In step (B), the mixture of the conductive carbon support and the nitrogen-containing organic material is primarily annealed in ambient air.

The primary annealing in ambient air is performed to react nitrogen atoms with the conductive carbon support to form a carbonitride. Similar results may be obtained also when the primary annealing is performed under other gas atmospheres (e.g., argon and oxygen atmospheres).

The composition of the ambient air includes 78.03% nitrogen, 20.95% oxygen, 0.94% argon, 0.03% carbon dioxide, and the balance of gases, such as neon, helium, krypton, xenon, on a weight basis.

The primary annealing is performed at a temperature of 90 to 150° C., preferably 100 to 120° C. If the annealing temperature is lower than the lower limit defined above, nitrogen atoms may not be doped into the conductive carbon support. Meanwhile, if the annealing temperature is higher than the upper limit defined above, doping of nitrogen atoms may not be adjusted as desired.

The primary annealing time is in the range of 2 to 10 hours, preferably 3 to 5 hours. Outside this range, nitrogen atoms may not be uniformly doped into the conductive carbon support or may not be doped in an appropriate amount.

In step (C), the primarily annealed mixture is secondarily annealed at a temperature higher than the primary annealing temperature under a nitrogen atmosphere.

The secondary annealing under a nitrogen atmosphere is performed to dope nitrogen atoms into the conductive carbon support. Similar results may also be obtained upon annealing under an argon atmosphere. However, if the secondary annealing is performed under other gas atmospheres (e.g., ammonia and oxygen atmospheres), the carbon support may be vaporized as a result of oxidation or the amount of nitrogen atoms doped may not be adjusted to a desired level, failing to obtain the desired performance.

The secondary annealing temperature is from 500 to 750° C., preferably from 550 to 700° C. If the secondary annealing temperature is lower than the lower limit defined above, nitrogen atoms may not be doped. Meanwhile, if the secondary annealing temperature exceeds the upper limit defined above, the nitrogen-containing organic material may be denatured.

The secondary annealing temperature is higher by 400 to 600° C., preferably 460 to 550° C., than the primary annealing temperature. If the difference between the primary and secondary annealing temperatures is smaller than the lower limit defined above, nitrogen atoms may not be doped into the conductive carbon support. Meanwhile, if the temperature difference is larger than the upper limit defined above, only a small amount of the nitrogen atoms may be doped into the conductive carbon support.

The present invention also provides a catalyst for a fuel cell using the carbon support.

The catalyst of the present invention includes the carbon support and a metal supported on the carbon support.

The metal may be selected from the group consisting of platinum, gold, silver, iridium, palladium, rhodium, and combinations thereof.

The following examples are provided to assist in further understanding of the invention. However, these examples are intended for illustrative purposes only. It will be evident to those skilled in the art that various modifications and changes can be made without departing from the scope and spirit of the invention and such modifications and changes are encompassed within the scope of the appended claims.

EXAMPLE 1

$Pt/C_{doped\ with\ nitrogen\ atoms}$ Catalyst

Preparation of Carbon Support Doped with Nitrogen Atoms 1.0 g of carbon black and 1.0 g of dicyandiamide were dissolved in 20 mL of double-distilled water. The solution was primarily annealed at 100° C. in ambient air for 4 h and was then secondarily annealed at 650° C. under a nitrogen atmosphere for 4 h to prepare a carbon support in which nitrogen atoms were doped.

Production of $Pt/C_{doped\ with\ nitrogen\ atoms}$ Catalyst (Pt 20 wt %)

0.05 g of the carbon support in which nitrogen atoms were doped was mixed with 100 mL of ethylene glycol as a solvent and the mixture was dispersed by sonication for 20 min. 0.0332 g of $H_2PtCl_6 \cdot 6H_2O$ was dissolved in 10 mL of ethylene glycol and dispersed by sonication for 5 min.

The carbon support solution was mixed with the Pt precursor solution. The mixture was stirred for 30 min. The resulting suspension was adjusted to pH 12, reduced by heating at 160° C. for 3 h, and stirred at room temperature for 12 h. After completion of the reaction, the obtained precipitate was adjusted to pH 3, washed with deionized water to completely remove impurities, dried in a vacuum oven at 40° C. for 24 h, and finally annealed at 160° C. or higher, affording a $Pt/C_{doped\ with\ nitrogen\ atoms}$ catalyst.

Comparative Example 1

Pt/C Catalyst_Commercial Catalyst 0.05 g of carbon black as a carbon support was mixed with 100 mL of ethylene glycol as a solvent and the mixture was dispersed by sonication for 20 min. 0.0332 g of $H_2PtCl_6 \cdot 6H_2O$ was dissolved in 10 mL of ethylene glycol and dispersed by sonication for 5 min.

The carbon support solution was mixed with the Pt precursor solution. The mixture was stirred for 30 min. The resulting suspension was adjusted to pH 12, reduced by heating at 160° C. for 3 h, and stirred at room temperature for 12 h. After completion of the reaction, the obtained precipitate was adjusted to pH 3, washed with deionized water to completely remove impurities, dried in a vacuum oven at 40° C. for 24 h, and finally annealed at 160° C. or higher, affording a Pt/C catalyst.

<Test Examples>

[Analysis of Electrochemical Properties]

Electrochemical tests of the catalysts were conducted in rotating disk electrode (RDE) three-electrode cells. In each cell, a 0.1 M $HClO_4$ solution was used as an electrolyte. The solution was maintained at a temperature of 25° C. A platinum wire electrode was used as a counter electrode and a saturated calomel electrode (SCE) was used as a reference electrode.

Electrochemical properties between $H_2$ and Pt were investigated by cyclic voltammetry (CV). For cyclic voltammetry, high-purity argon (Ar) gas was purged at a flow rate of 400 cc/min through the cell for about 30 min to remove oxygen from the solution. The argon (Ar) gas atmosphere was maintained at the same flow rate until completion of the test. The cyclic voltammetry was performed to investigate the performance of Pt through oxygen reduction reaction. Then, the electrolyte solution was purged with oxygen ($O_2$) gas at the same flow rate as the argon (Ar) gas for about 30 min to create an oxygen atmosphere. Thereafter, the oxygen ($O_2$) atmosphere was maintained at the same flow rate upon completion of the test.

10 mg of the catalyst prepared in Example 1 was added to a mixture of 800 μL of isopropyl alcohol and 60 μL of a Nafion solution (5 wt % solution), and the mixture was dispersed by sonication to prepare a catalyst ink. 5 μL of the ink was transferred onto a glassy carbon rotating disk electrode (RDE, 5 mm diameter) by micropippetting, followed by drying.

A catalyst ink was prepared in the same manner as described above, except that the catalyst of Comparative Example 1 was used.

Cyclic Voltammetry (CV)

Cyclic voltammetry (CV) was performed in the potential range of 0 $V_{RHE}$ to 1.1 $V_{RHE}$. Electrochemically active surface area (ECSA) values were evaluated based on $H_2$ desorption peaks observed in the potential range of 0.05 $V_{RHE}$ to 0.35 $V_{RHE}$ according to Equation 1. The $H_2$ desorption potential of 0.21 $mC/cm^2$ was assumed for the calculation of active Pt sites.

$$ECSA(m^2/g) = \frac{Q_H}{[Pt] \times 0.21} \quad (1)$$

where [Pt] indicates the platinum loading on the electrode and $Q_H$ is the charge of $H_2$ desorption.

Oxygen Reduction Reaction (ORR)

Each oxygen reduction reaction (ORR) test was conducted in an oxygen-saturated 0.1 M $HClO_4$ solution at room temperature. The rotation rate of the RDE was 1600 rpm and the voltage sweep rate was 5 mV/s.

ORR activity was observed at 0.75-0.95 V.

Accelerated Degradation Testing (ADT) on Half Cells

ADT was conducted to evaluate the catalysts prepared in Example 1 and Comparative Example 1. For ADT, CVs were measured by potential cycling from 0.6 $V_{RHE}$ to 1.1 $V_{RHE}$ at a scan rate of 50 mV/s in $O_2$ purged 0.1 M $HClO_4$ solution at room temperature. ADT consisted of 6000 cycles for each catalyst. The catalysts were tested under the same potential cycling conditions. CVs were used to determine the Pt surface areas of the catalysts by measuring $H_2$ desorption before and after potential cycling.

Accelerated degradation testing (ADT) on single cells Similarly to the testing on half cells, accelerated degradation testing on single cells was conducted. Specifically, CVs were measured by potential cycling from 0.6 to 1.1 $V_{RHE}$ at a scan rate of 50 mV/s, a temperature of 70° C. for driving single cells, and an RH of 100%. In the accelerated degradation testing for the performance of single cells, linear sweep voltages (LSVs) and cyclic voltammograms (CVs), together with I-V curves, were obtained every 2,000 cycles.

For the accelerated degradation testing, single cells were fabricated by the following procedure. First, the catalyst of Example 1 was dissolved in Nafion ionomer and isopropyl alcohol as a solvent to prepare a catalyst solution. A Nafion membrane was immersed in distilled water for one day to form a sufficient number of ion channels therein. The sufficiently hydrated Nafion membrane was spread and fixed, and then the catalyst of Example 1 was sprayed thereon using a spray gun. The catalyst was loaded in amounts of 0.1 $mg_{pt}/cm^2$ and 0.4 $mg_{pt}/cm^2$ on an anode and a cathode, respectively. The active area of the catalyst was 5 $cm^2$. The membrane and the electrodes were integrated together to construct a membrane electrode assembly.

The membrane electrode assembly was naturally dried until the solvent was completely vaporized from the catalyst solution. Thereafter, the membrane electrode assembly was fastened with a Teflon gasket and a carbon bipolar plate under a pressure of 100 In*lb to fabricate a single cell, which was used for accelerated degradation testing.

Test Example 1

ORR Measurement

FIG. 1 shows oxygen reduction reaction (ORR) polarization curves of the Pt/$C_{doped\ with\ nitrogen\ atoms}$ catalyst prepared in Example 1 and the Pt/C catalyst prepared in Comparative Example 1 to compare the initial performance of half cells using the catalysts.

FIG. 1 shows the current densities of the catalysts prepared in Example 1 and Comparative Example 1 on rotating disks at 1600 rpm to investigate the ORR characteristics of the catalysts.

As shown in FIG. 1, the ORR characteristics of the catalysts are determined by diffusion at potentials of 0.7 $V_{RHE}$ or below and by diffusion and reaction at potentials of 0.7-0.9 $V_{RHE}$. The results of ORR measurement reveal that the Pt/$C_{doped\ with\ nitrogen\ atoms}$ catalyst of Example 1 showed higher catalytic activity than the commercial Pt/C catalyst of Comparative Example 1 over the entire potential range.

Test Example 2

CV and ORR Measurements Through Accelerated Degradation Testing on Half Cells

Figure 2:
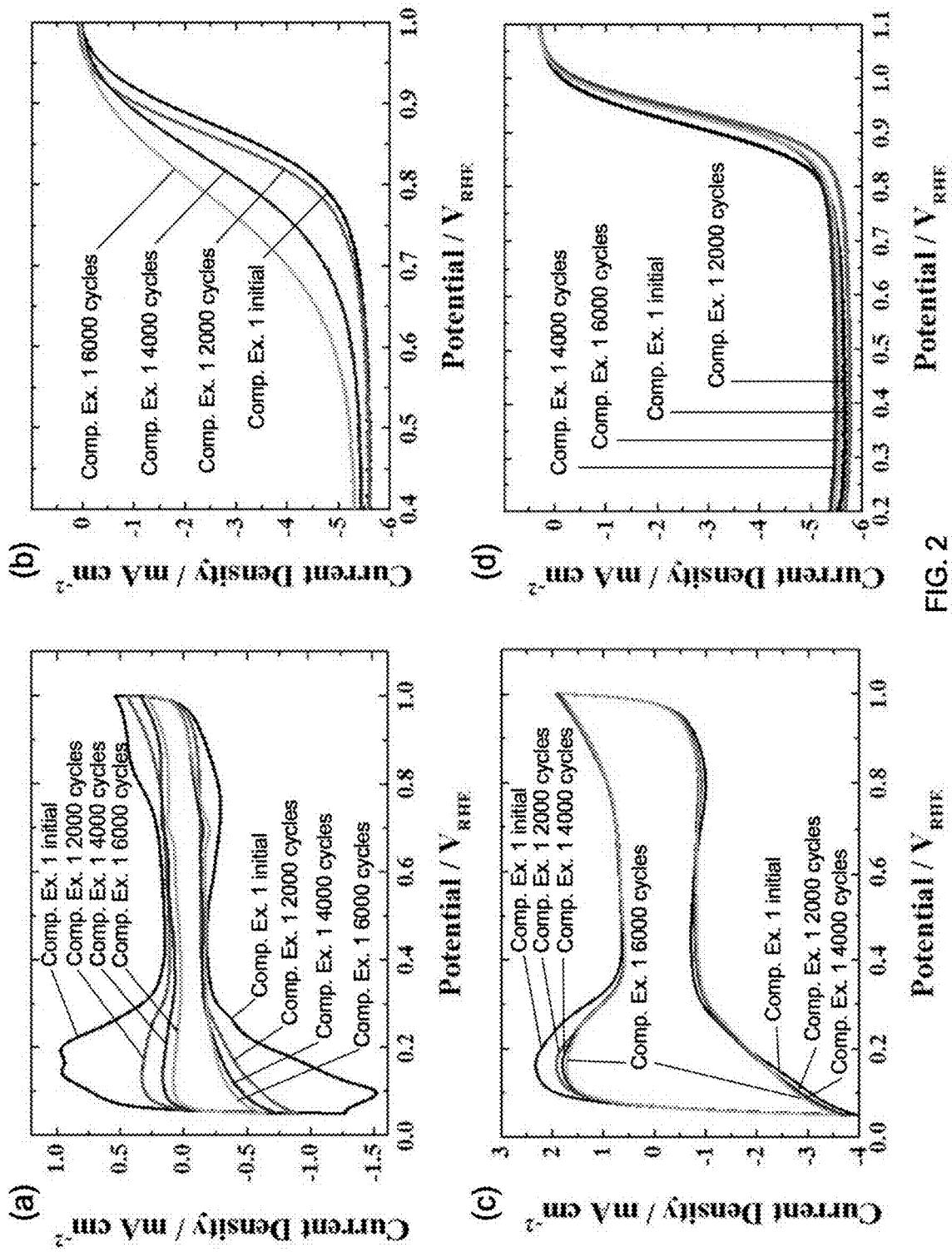
FIG. 2 shows (a, c) cyclic voltammograms (CVs) and (b, d) ORR polarization curves of a $Pt/C_{doped\ with\ nitrogen\ atoms}$ catalyst prepared in Example 1 and a Pt/C catalyst prepared in Comparative Example 1 through accelerated degradation testing on half cells using the catalysts to evaluate the electrochemical performance of the half cells.

FIG. 2 shows (a, c) cyclic voltammograms (CVs) and (b, d) ORR polarization curves (b, d) of the Pt/$C_{doped\ with\ nitrogen\ atoms}$ catalyst prepared in Example 1 and the Pt/C catalyst prepared in Comparative Example 1 through accelerated degradation testing on for half cells using the catalysts to evaluate the electrochemical performance of the half cells.

FIG. 2 shows the degradation resistance of the Pt/$C_{doped\ with\ nitrogen\ atoms}$ catalyst prepared in Example 1 and the Pt/C catalyst prepared in Comparative Example 1 in half cells.

FIG. 2 also shows cyclic voltammograms (CVs) of the catalysts at a scan rate of 20 mV/s in Ar-saturated 0.1 M $HClO_4$ solutions at room temperature.

As shown in FIG. 2, 67% of the initial ECSA of the catalyst of Example 1 remained after 6000 cycles compared to before the reaction and was about 11-fold larger than that (6%) of the initial ECSA of the commercial catalyst of Comparative Example 1, as evaluated under the same conditions. These results indicate that the catalyst of Example 1 was more stable in electrochemical performance than the commercial catalyst of Comparative Example 1.

The degradation resistance of the catalysts was also confirmed through changes in ORR activity. To this end, changes in half-wave potential after 6000 cycles were measured. As a result, the initial potential (0.867 V) of the catalyst of Comparative Example 1 was reduced to 0.777 after 6,000 cycles, whereas the initial potential (0.907 V) of the catalyst of Example 1 was not substantially reduced even after 6,000 cycles (0.928 V). From these results of the degradation tests, it was confirmed that the performance of the catalyst of Example 1 was not deteriorated.

Test Example 3

Accelerated Degradation Testing on the Single Cells

Figure 3:
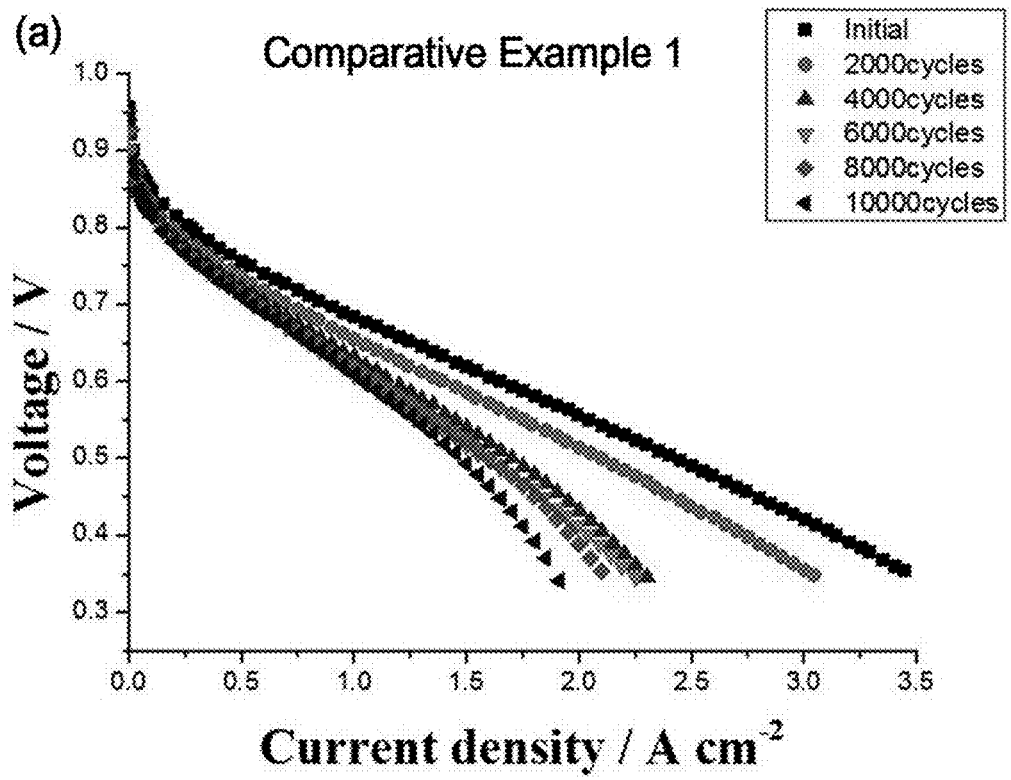
FIG. 3 graphically shows the performance and degradation characteristics of a single cell using a $Pt/C_{doped\ with\ nitrogen\ atoms}$ catalyst prepared in Example 1 and a single cell using a Pt/C catalyst prepared in Comparative Example 1 through current-voltage (I-V) measurements.
Figure 3:
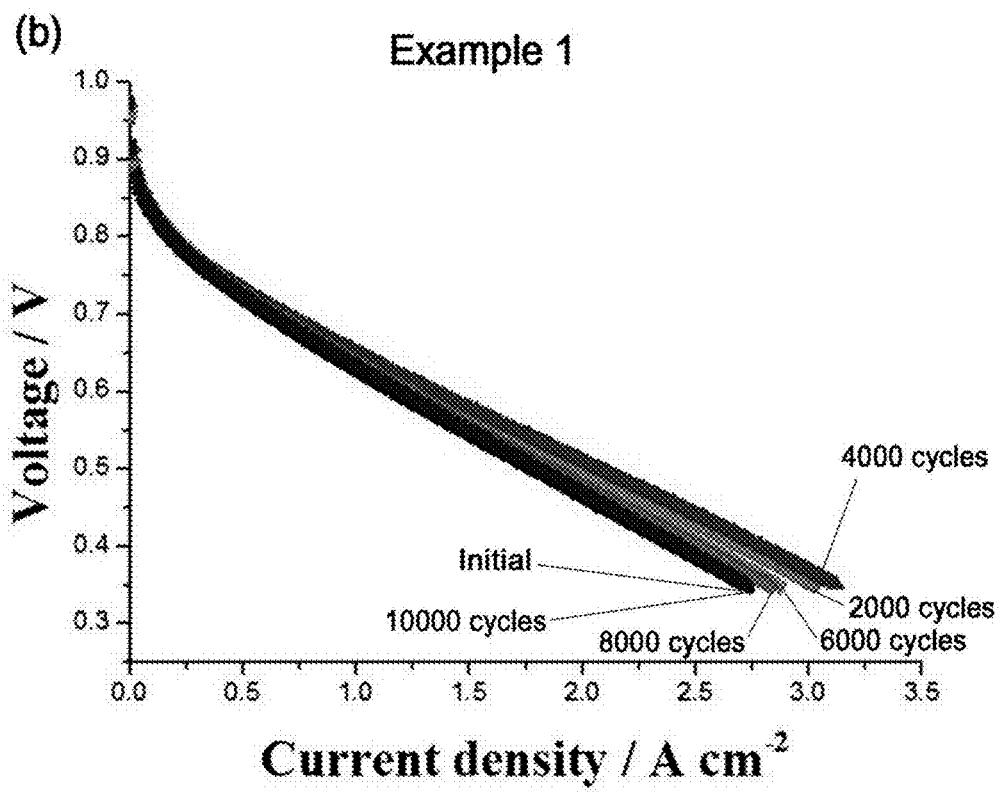
Figure 4A:
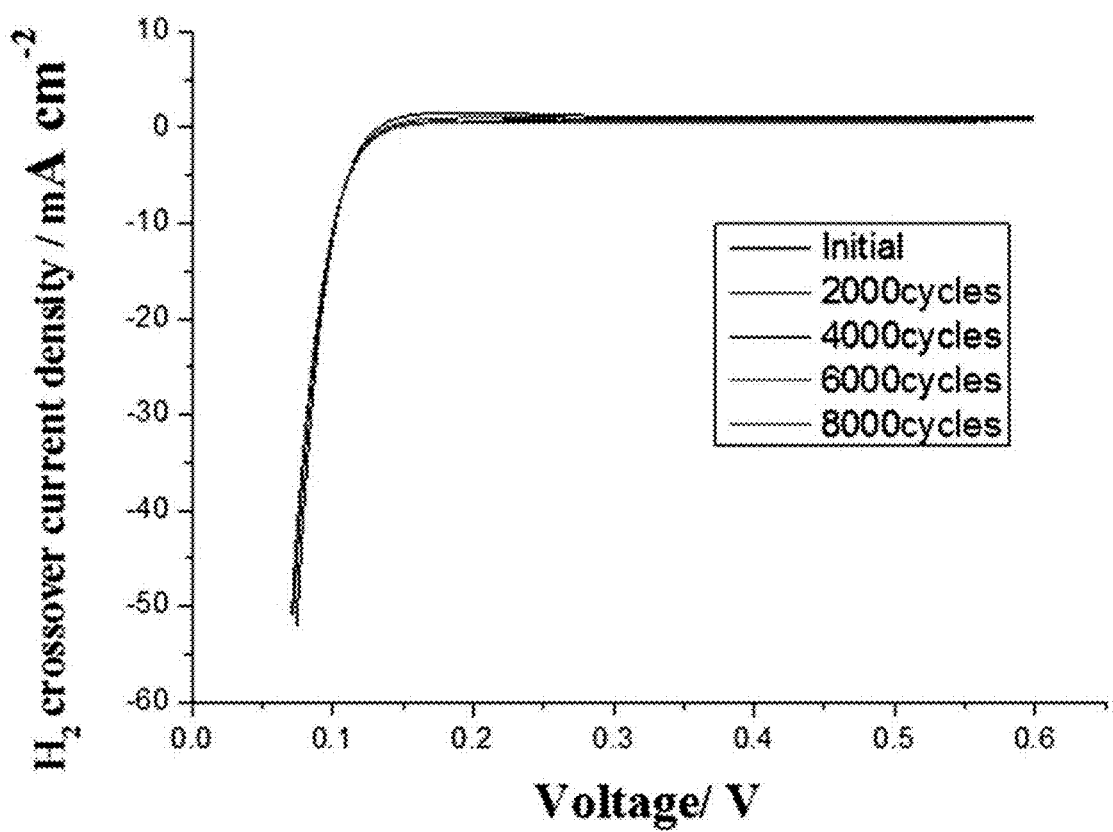
FIGS. 4a and 4c show linear sweep voltages (LSVs) and FIGS. 4b and 4d show cyclic voltammograms (CVs) of a $Pt/C_{doped\ with\ nitrogen\ atoms}$ catalyst prepared in Example 1 and a Pt/C catalyst prepared in Comparative Example 1, which were measured after the operations of single cells using the catalysts were evaluated through accelerated degradation testing.
Figure 4B:
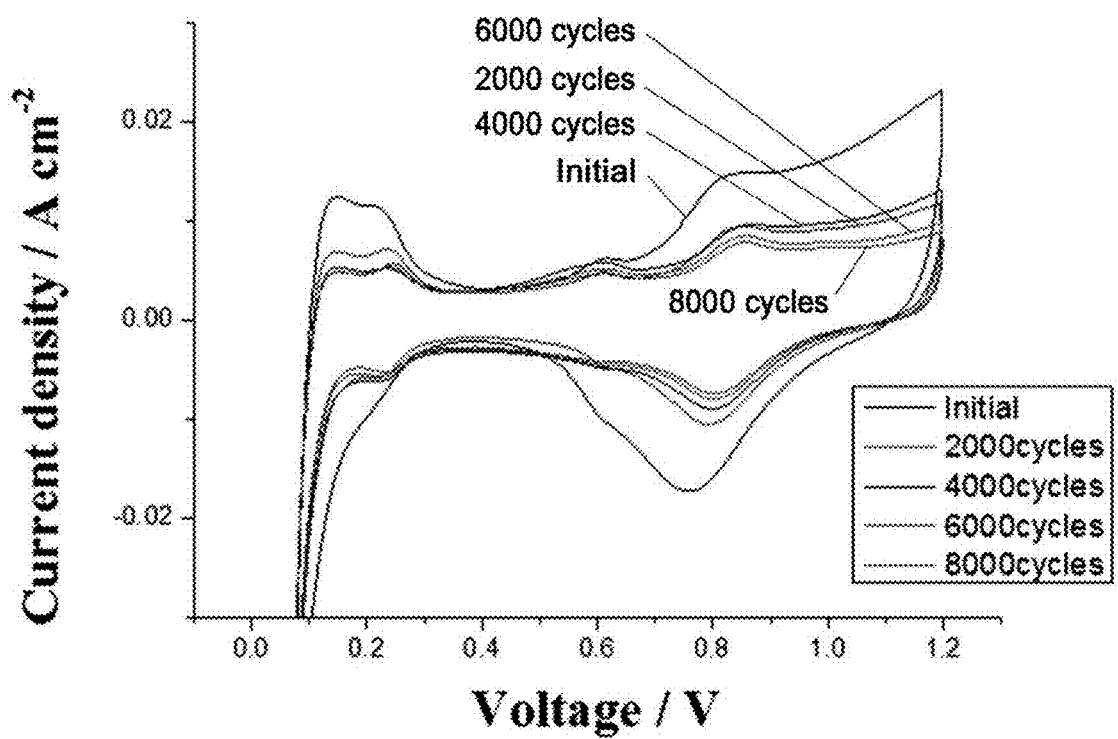
Figure 4C:
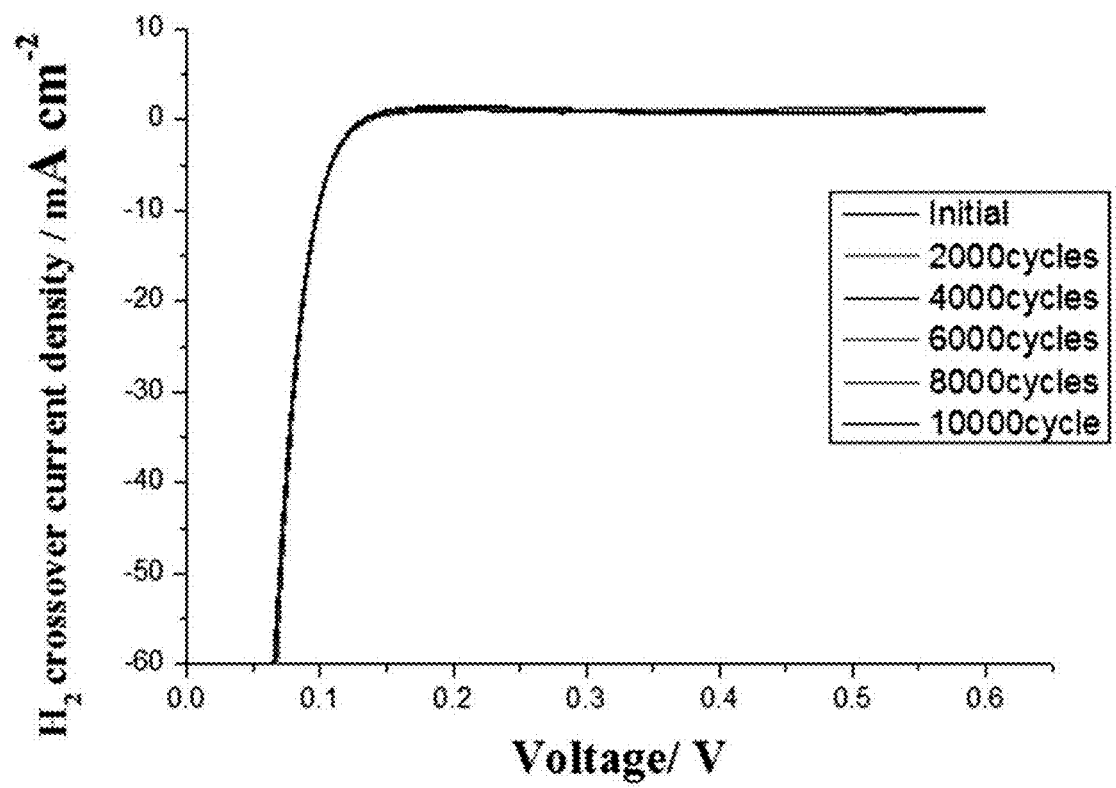
Figure 4D:
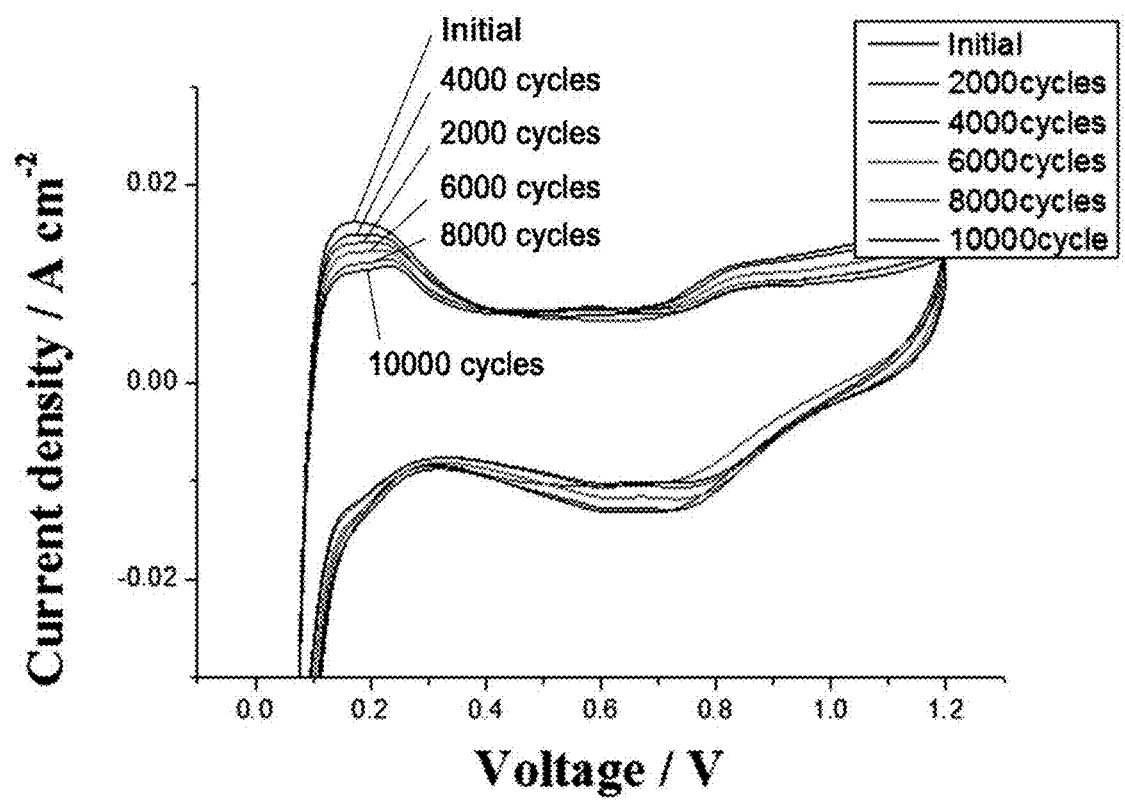

FIG. 3 graphically shows the performance and degradation characteristics of the single cell using the Pt/$C_{doped\ with\ nitrogen\ atoms}$ catalyst prepared in Example 1 and the single cell using the Pt/C catalyst prepared in Comparative Example 1 through current-voltage (I-V) measurements.

FIG. 3 shows I-V curves of the single cell fabricated based on the Pt/$C_{doped\ with\ nitrogen\ atoms}$ catalyst of Example 1 and the single cell fabricated based on the Pt/C catalyst of Comparative Example 1 during operation. For the measurement of I-V curves, hydrogen and air were supplied to the anode and cathode at flow rates of 150 cc/min and 1800 cc/min, respectively, and the current was varied from 0 A to 40 A at a rate of 50 mA/s.

The current densities of the single cells at 0.6 V are shown in Table 1.

As can be seen from the accelerated degradation testing results shown in FIG. 3 and Table 1, the initial current density of the single cell using the catalyst of Comparative Example 1 was 1.65 A/cm$^2$, which was higher than that (1.172 A/cm$^2$) of the single cell using the catalyst of Example 1. After 2000 cycles, the current density of the single cell using the catalyst of Example 1 was increased by 11%, whereas that of the single cell using the catalyst of Comparative Example 1 was reduced by 15%.

The rates of reduction in the current density of the single cells after every 2000 cycles of operation were calculated. As a result, the current densities of the single cell using the commercial catalyst of Comparative Example 1 were reduced to 85% (after 2,000 cycles), 69% (after 4,000 cycles), 65% (after 6,000 cycles), 61% (after 8,000 cycles), and 60% (after 10,000 cycles) of its initial value. In contrast, the current densities of the single cell using the catalyst of Example 1 were increased to 111% (after 2,000 cycles), 115% (after 4,000 cycles), 105% (after 6,000 cycles), 103% (after 8,000 cycles), and 100% (after 10,000 cycles) of its initial value. That is, the single cell using the catalyst of Example 1 showed higher current densities during operation than its initial value and underwent less reduction in performance than the single cell using the catalyst of Comparative Example 1.

TABLE 1

| Number of cycles | Example 1 Current density (A/cm$^2$) | Comparative Example 1 Current density (A/cm$^2$) |
| --- | --- | --- |
| Initial (0) | 1.172 | 1.65 |
| 2000 | 1.302 | 1.40 |
| 4000 | 1.352 | 1.14 |
| 6000 | 1.232 | 1.08 |
| 8000 | 1.212 | 1.02 |
| 10000 | 1.172 | 0.99 |

Test Example 4

LSV and CV Measurements

FIG. 4 graphically shows (a, c) linear sweep voltages (LSVs) and (b, d) cyclic voltammograms (CVs) of the Pt/C$_{doped\ with\ nitrogen\ atoms}$ catalyst prepared in Example 1 and the Pt/C catalyst prepared in Comparative Example 1, which were measured after the operations of the single cells using the catalysts were evaluated through accelerated degradation testing. For the measurements of LSVs and CVs, hydrogen and nitrogen were supplied to the anode and the cathode, respectively.

As shown in FIG. 4, the linear sweep voltages (LSVs) were determined by the measurement of hydrogen crossover current densities generated when hydrogen remaining unreacted at the anode crossed over to the cathode. No significant difference was observed in LSV between the catalysts of Comparative Example 1 and Example 1. That is, it is believed that the single cell membranes did not affect the measurements and the changes in the corresponding measured values were attributed to the different catalysts.

Adsorption/desorption reactions between the hydrogen supplied during operation and the platinum electrodes of the single cells could be observed by the cyclic voltammograms (CV) to confirm the electrochemically active areas of the catalysts. The current densities were measured a total of 5 times from 0.05 V to 1.2 V at a rate of 50 mV/s. The measurements were confirmed to be reproducible and the fifth measured values are plotted in FIGS. 4b and 4d. Similarly to the results of the half cells, the CV results of the single cell structures reveal that insignificant changes in ECSA were observed in the catalyst of Example 1 under the same conditions, demonstrating that the catalyst of Example 1 was stable also in the single cell.

The ECSA values of the catalysts obtained from the CVs of the single cells are as follows. The initial catalytically active area of the commercial catalyst of Comparative Example 1 was 41.08 g/m$^2$ and gradually decreased to 16.44 g/m$^2$ (40% of the initial value), 10.98 g/m$^2$ (27% of the initial value), 8.45 g/m$^2$ (21% of the initial value), 6.71 g/m$^2$ (16% of the initial value), and 5.90 g/m$^2$ (14% of the initial value). The catalytically active area of the commercial catalyst of Comparative Example 1 was greatly decreased by a total of 17% after 2,000 cycles.

In contrast, the initial catalytically active area of the catalyst of Example 1 was 39.33 g/m$^2$ and gradually decreased to 36.84 g/m$^2$ (94% of the initial value), 29.76 g/m$^2$ (76% of the initial value), 20.85 g/m$^2$ (53% of the initial value), 16.44 g/m$^2$ (42% of the initial value), and 16.25 g/m$^2$ (41% of the initial value). The catalytically active area of the catalyst of Example 1 was decreased by 12% after 2,000 cycles. These results confirm that the catalyst of Example 1 had better degradation resistance than the catalyst of Comparative Example 1.

Test Example 5

TEM Measurement

Figure 5:
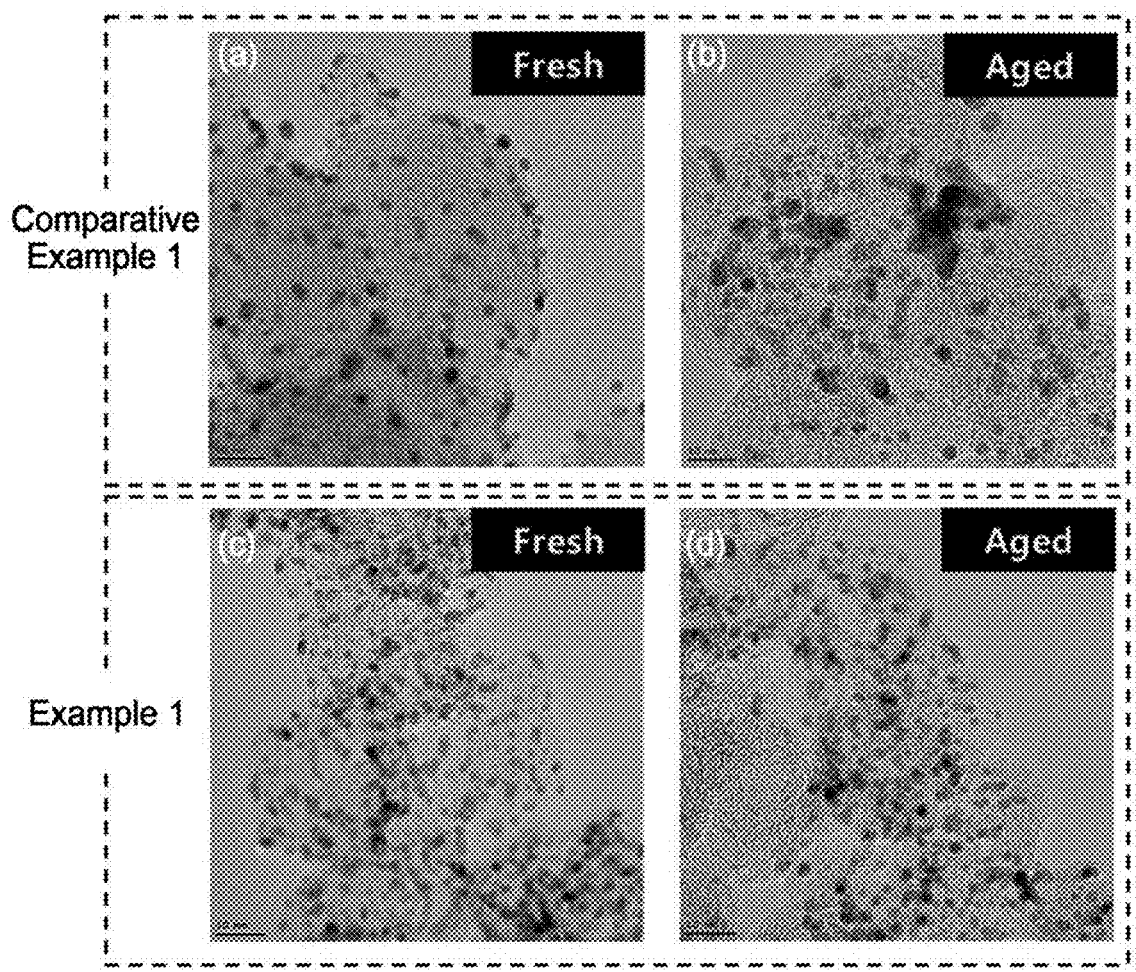
FIG. 5 shows transmission electron micrographs of a $Pt/C_{doped\ with\ nitrogen\ atoms}$ catalyst prepared in Example 1 and a Pt/C catalyst prepared in Comparative Example 1 before and after accelerated degradation testing on single cells using the catalysts.

FIG. 5 shows transmission electron microscopy (TEM) images of the Pt/C$_{doped\ with\ nitrogen\ atoms}$ catalyst prepared in Example 1 and the Pt/C catalyst prepared in Comparative Example 1 before and after accelerated degradation testing on the single cells.

As shown in FIG. 5, the Pt particles were uniformly distributed over the entire areas of the catalysts of Example 1 and Comparative Example 1 before accelerated degradation testing. The Pt particles were calculated to have an average size of 2-3 nm.

For the catalyst of Comparative Example 1, the Pt particle size was increased from 2-3 nm to 6-10 nm after potential cycling, indicating that Pt agglomeration arising from carbon corrosion is a major cause of ECSA loss of the platinum in the Pt/C catalyst.

In contrast, for the catalyst of Example 1, no substantial change in the Pt particle size was observed before and after potential cycling, demonstrating greatly improved electrochemical resistance of the carbon support in which nitrogen atoms were doped.

What is claimed is:

1. A method for preparing a nitrogen-doped carbon support for a fuel cell catalyst, the method comprising:
   (A) mixing a conductive carbon support with a nitrogen-containing organic material;
   (B) primarily annealing the mixture at 90 to 150° C. for 2 to 10 hours in a normal air atmosphere so as to react nitrogen atoms of the nitrogen-containing material with the support; and
   (C) secondarily annealing the primarily annealed mixture at 600 to 750° C. under a nitrogen atmosphere so as to completely dope the nitrogen atoms into the support.

2. The method according to claim 1, wherein in step (A), the conductive carbon support is mixed with the nitrogen-containing organic material in a weight ratio of 1:1-2.

3. The method according to claim 1, wherein in step (A), the conductive carbon support and the nitrogen-containing organic material are dissolved in at least one solvent selected from the group consisting of distilled water and methanol, ethanol, and ethylene glycol as organic solvents.

4. The method according to claim 1, wherein in step (A), the conductive carbon support is selected from the group consisting of carbon black, acetylene black, graphite, graphene, fullerenes, and combinations thereof.

5. The method according to claim 4, wherein the fullerenes are in the form of carbon nanotubes (CNTs).

6. The method according to claim 4, wherein the graphite is in the form of graphite nanofibers (GNFs).

7. The method according to claim 1, wherein in step (A), the nitrogen-containing organic material is selected from the group consisting of dicyandiamide, pyrrole, aniline, phthalocyanine, porphyrin, acetonitrile, cyanamide, acrylonitrile, polypyrrole, polyaniline, polyacrylonitrile, melamine, and mixtures thereof.

8. The method according to claim 1, wherein the primary annealing is performed for 3 to 5 hours.

9. The method according to claim 1, wherein the primary annealing is performed at 100 to 120° C.

10. The method according to claim 1, wherein the reaction forms a carbonitride.

11. The method according to claim 1, wherein the secondary annealing is performed at 550 to 700° C.

12. The method according to claim 1, wherein the amount of the nitrogen atoms doped into the conductive carbon support is from 5 to 50 parts by volume, based on 100 parts by volume of the conductive carbon support.

* * * * *